(12) United States Patent
Petit (10) Patent No.: US 10,976,005 B2
(45) Date of Patent: Apr. 13, 2021

(54) OVER AN AXLE GREASE TOOL FOR REPACKING WHEEL BEARING WITH GREASE, AND METHOD OF USING SAME

(71) Applicant: Denis Petit, Merrimack, NH (US)

(72) Inventor: Denis Petit, Merrimack, NH (US)

( * ) Notice: Subject to any disclaimer, the term of this patent is extended or adjusted under 35 U.S.C. 154(b) by 350 days.

(21) Appl. No.: 16/123,556

(22) Filed: Sep. 6, 2018

(65) Prior Publication Data
US 2020/0080687 A1 Mar. 12, 2020

(51) Int. Cl.
*F16N 37/00* (2006.01)
*F16N 21/02* (2006.01)

(52) U.S. Cl.
CPC ........... *F16N 37/003* (2013.01); *F16N 21/02* (2013.01); *F16N 2037/006* (2013.01); *F16N 2210/04* (2013.01); *F16N 2210/14* (2013.01)

(58) Field of Classification Search
CPC ................. F16N 37/003; F16N 21/006; F16N 2037/006; F16N 2210/04; F16N 2210/14; F16N 21/02
See application file for complete search history.

(56) References Cited

U.S. PATENT DOCUMENTS

| | | | | |
|---|---|---|---|---|
| 4,293,056 A | * | 10/1981 | Setree, II | B60B 35/02 184/105.3 |
| 5,303,800 A | * | 4/1994 | Persson | B60B 27/001 184/45.1 |
| 5,658,053 A | * | 8/1997 | Vencill | B60B 7/002 301/105.1 |
| 6,247,554 B1 | * | 6/2001 | Pool | F16C 33/6622 184/5.1 |
| 8,205,639 B2 | * | 6/2012 | Kim | F16K 1/12 137/614.2 |
| 2017/0268722 A1 | * | 9/2017 | Smith | F16N 37/003 |
| 2017/0370412 A1 | * | 12/2017 | Petit | F16N 37/003 |

OTHER PUBLICATIONS

Motoparty—JDMSpeed New Wheel Bearing Greaser Tool, Date first available Nov. 17, 2018, Amazon 2018.*

* cited by examiner

*Primary Examiner* — Michael R Mansen
*Assistant Examiner* — Mark K Buse
(74) *Attorney, Agent, or Firm* — Davis & Bujold, PLLC; Michael J. Bujold (57) ABSTRACT

A grease tool and method for greasing a wheel bearing where the grease tool includes a handle and manifold. The handle and manifold define a central passage that extends through the grease tool. A supply channel is formed radially between the central passage and an exterior surface of the grease tool and extends axially through the handle to an annular supply recess formed in the manifold. A grease fitting attached to the grease tool to facilitate a supply of grease through the supply channel and the supply recess to an inwardly facing surface of the wheel bearing. The central passage in the grease tool facilitating sliding the grease tool over an axle that extends through the wheel bearing and positioning of the grease tool within the wheel bearing evenly repacking of the bearing in a position over the axle.

19 Claims, 8 Drawing Sheets

OVER AN AXLE GREASE TOOL FOR REPACKING WHEEL BEARING WITH GREASE, AND METHOD OF USING SAME

FIELD OF THE INVENTION

The present invention relates to a grease tool which facilitates supplying grease to an inner race of a wheel bearing, such as a dual angular contact bearing, which is installed in a hub or spindle, over an axle, in order to replenish the supply of grease which is typically required for packing the bearing with grease having sufficient lubrication of the ball bearings contained therein.

BACKGROUND OF THE INVENTION

A conventional grease tool allows grease to be inserted and displace any water, air pockets or other contaminants located within a bearing chamber defined by the bearing, thereby greatly reducing the possibility of outside contaminants entering the bearing and causing premature failure of the bearing. To truly pack the wheel bearing evenly with grease prior art methods and techniques typically involve removal of the bearing from the axle on which it is supported before the tool can be utilized to supply grease to an inner race of the wheel bearing. In addition, prior art grease tools require access to both sides of the wheel bearing thereby requiring, precisely machined mechanical assemblies to be mated together with one another from opposite sides. Some prior art only have one supply port for grease not effectively packing the wheel bearing. Moreover, they are generally not easy to insert, typically resulting in direct metal to metal contact, and rely on a body, a cap or a cover, and a threaded device to fasten the grease tool components to the bearing which runs the risk of scratching the bearing surface and possibly rendering the bearing unusable. Generally, the bearings are removed from the axle before the supply of grease can be replenished. The task of packing or replenishing a bearing with grease is generally quite time intensive as the axle needs to be removed from the bearing prior to grease being applied and reinstallation of the bearing after being supplied with the grease.

SUMMARY OF THE INVENTION

Wherefore, it is an object of the present invention to overcome the above-mentioned shortcomings and drawbacks associated with the prior art tools for greasing a bearing.

The present invention relates to a tool that allows a simple process in order to add grease to a conventional wheel bearing and properly pack the wheel bearing evenly and efficiently. The process involves removing the wheel hub from the axle, which is maintained in position with respect to the wheel bearing, such that the wheel bearing is accessible. Next, the grease tool is inserted in the inner race of the wheel bearing and over the axle. Then a conventional grease dispenser is connected to the nipple of the grease tool and a supply of grease is pumped into the grease tool and supplied to the wheel bearing. Once a sufficient supply of grease is added to the wheel bearing, the grease dispenser is disconnected and the grease tool is removed from the inner race of the wheel bearing and then the components coupled to the wheel bearing are reassembled.

The grease tool is generally a single sided tool since there normally is not any need to have access to the opposed sides of a wheel bearing. The grease tool, according to the invention, generally avoids metal to metal contact, is self-centering with self pressurizing O-rings which seal and protect, and typically has at least one delivery port, passage, or channel, e.g., generally 2 to 20 radial delivery ports, which evenly and uniformly distribute the supplied grease about the periphery of the grease tool. It is to be appreciated that the total number of delivery ports, passages, or channels can vary from application to application. The most important aspect is that the supplied grease is conveyed to the entire exterior surface of the grease tool for radial distribution into the entire circumference of the wheel bearing giving an even packing supply of grease.

A further object of the present invention is to provide a generally cylindrical grease tool with central axle passage that extends through the grease tool. The central axle passage enables the grease tool to be utilized "over the axle" for supplying grease to the inside of the wheel bearing. In other words, the wheel axle does not need to be removed from the wheel bearing when the wheel bearing is being supplied with grease by the grease tool since the axle slides through a central portion of the grease tool as the grease tool is being inserted into the wheel bearing. Since it is not necessary to fully disassemble the axle/hub/bearing assembly in order to supply an even and uniform amount of grease to the wheel bearings with the grease tool of the present invention, the associated time and costs with supplying grease to wheel bearings is thereby minimized.

Another object of the present invention is to provide a grease tool which is relatively inexpensive to manufacture and is relatively easy to use and remove from the wheel bearing.

A further object of the present invention is to provide a grease tool which generally self-centers itself, within the inner race of the wheel bearing to be greased, and allows the axle to pass centrally therethrough so as to expedite installation of the grease tool within the wheel bearing to be greased and facilitate the supplying grease to a wheel bearing.

Still another object of the present invention is to provide a grease tool which facilitates purging or displacing of water, air pockets, voids, dirt, debris, and/or other contaminants from the bearing chamber of the wheel bearing and thereby facilitates repacking of the wheel bearing with a fresh supply of grease.

Yet another object of the present invention is to minimize the size of the space defined between the exterior cylindrical surface of the grease tool, the pair of O-rings and the inwardly facing surface of the inner race so as to minimize the amount of grease required to be supplied to the wheel bearing in order to adequately grease the wheel bearing and thereby avoid wasting grease. Due to the axial distance between the pair of O-rings, the grease tool can be used with a number of wheel bearings having different widths A further object of the invention is to provide a sufficient seal clearance between the exterior outwardly facing surface of the grease tool and the radially inwardly facing surface of the inner race to facilitate easy insertion and withdrawal of the grease tool relative to the radially inwardly facing surface of the inner race.

A still further object of the present invention is to provide the grease tool with a built-in shoulder or stop which abuts against a lateral surface of the inner race and automatically and properly radially aligns the one or more delivery port(s) with the gap provided between the inner races of the wheel bearing to facilitate supplying grease thereto.

Yet another object of the invention is to provide a grease tool which permits servicing of wheel bearings which have a wide range of axial widths.

Another object of the invention is to provide a grease tool which can readily be disassembled in order to facilitate cleaning and/or maintenance thereof.

A further object of the invention is to provide a grease tool which avoids forcing the pair of inner races toward one another and thereby facilitates the supply of grease to the bearing chamber without compromising the external seals of the wheel bearing.

The present invention also relates to a grease tool for sliding over an axle and mating with at least one inner race of a wheel bearing for greasing the wheel bearing while the axle is located within the wheel bearing. The grease tool comprises a handle and a manifold with a central passage that extends through both the manifold and the handle and which receives the axle. The grease tooling has a shoulder that abuts against the at least one inner race of the wheel bearing and prevents further insertion of the grease tool into at least one inner race. A grease fitting is attached to a trailing surface of the handle to facilitate supplying grease to the grease tool, and the grease fitting is coupled to a supply passage for conveying grease to an annular delivery recess formed in an exterior cylindrical surface of the manifold. A pair of spaced apart O-rings are accommodated by the exterior cylindrical surface of the manifold, and the annular delivery recess is formed in the exterior cylindrical surface of the manifold between the pair of O-rings. The pair of spaced apart O-rings, when the grease tool engages with an inwardly facing surface of the inner race of the wheel bearing, form a pair of spaced apart grease seals which facilitate directing of the grease, supplied to the annular delivery recess, radially into a bearing chamber of the wheel bearing to facilitate repacking the bearing chamber with grease.

The present invention also relates to a grease tool for sliding over an axle and mating with at least one inner race of a wheel bearing for greasing of the wheel bearing while the axle is arranged within the wheel bearing. The grease tool comprises a manifold that has a leading end, a trailing end and a central passage that extends through the manifold from the leading end to the trailing end thereof. A handle has a leading end, a trailing end and central passage extending through the handle from the leading end to the trailing end thereof. The trailing end of the manifold is coupled to the leading end of the handle such that the central passage of the manifold and the central passage of the handle are coaxially aligned and form a central axial channel that extends through the grease tool. The handle has a supply duct that is radially arranged between the central axial channel and an exterior surface of the handle. The supply duct extends axially through the handle from the leading end of the handle to the trailing end of the handle. The manifold has at least one supply passage that is radially arranged between the central axial channel and an exterior surface of the manifold. The at least one supply passage extends axially from the trailing end of the manifold to an annular delivery recess in an exterior surface of the handle. The supply duct of the handle and the at least one supply passage of the manifold form a flow path along which a supply of grease passes from the trailing end of the handle and through the annular delivery recess to a radially exterior surface of the handle which is located within the at least one inner race of the wheel bearing.

In an advantageous further development of the invention, the grease tool is fabricated from a single piece of material so as to have a unitary body that includes the manifold portion and the handle portion with the handle portion having a larger outer diameter. A single supply passage axially extends from a trailing end of the handle portion to the annular delivery recess located in the manifold portion of the tool body. With the manifold and handle portions being formed together from a single piece of material and having only a single grease supply passage extending axially through the tool body, the process for manufacturing the grease tool is simplified and the costs associated with manufacturing the grease tool are reduced.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning now to FIGS. 1-5 and 10-12, a brief description concerning the various components of the grease tool 2, according to the present invention, will now be briefly discussed. Thereafter, use of the grease tool 2 to grease a conventional wheel bearing will then be described. Although the general term "wheel bearing" will be utilized in the following description, it is to be appreciated that the present invention is applicable to a variety of different wheel bearings, including such bearings as a dual angular contact bearing (as shown in FIGS. 8-12) or the like.

As shown in FIGS. 1-5, the grease tool 2 generally comprises a leading portion and a trailing portion which are releasably connected with one other for supplying grease to a wheel bearing 4 (see FIG. 12) while the wheel bearing 4 is generally partially assembled with the wheel axle 6. The leading portion of the grease tool 2 comprises a manifold 8, while the trailing portion of the grease tool 2 comprises a handle 10. In the following description, the use of terms such as "leading" and "trailing" relate to the direction in which the grease tool 2 is introduced into the wheel bearing 4 to supply the wheel bearing 4 with grease. When the manifold 8 and the handle 10 are connected together with one another, the grease tool 2 forms an elongate substantially cylindrical member that defines a longitudinal axis 14. The grease tool 2 has a central axle passage 12 which extends completely through the grease tool 2 from a leading end 16 to an axially opposite trailing end 18. In the manner described in more detail below, when the grease tool 2 is used for greasing or "packing" a wheel bearing 4, the grease tool 2 is inserted into the wheel bearing 4 by sliding or passing "over" the wheel axle 6. That is to say, the central axle passage 12 receives the wheel axle 6 as the grease tool 2 slides between the wheel axle 6 and the wheel bearing 4 to a suitable position for applying grease to the wheel bearing 4. The manifold 8 and handle 10 are typically manufactured from solid pieces of a ferrous or a non-ferrous material including but not limited to aluminum, plastic, steel, brass, etc., which can be connected together for delivery of grease to wheel bearing 4 (see FIGS. 5 and 10-12) as described below.

As shown in FIGS. 6A-6E, the manifold 8 supports the leading end 16 of the grease tool 2, i.e., the end of the grease tool 2 which is first introduced to the wheel axle 6, and also the first end inserted into the wheel bearing 4 when greasing the wheel bearing 4. The opposite end of the manifold 8 is referred to as the trailing end 20. Each of the leading and trailing ends 16, 20 of the manifold 8 comprise a respective end face 22, 24. The central axle passage 12 (see FIGS. 1, 2) extends completely through the manifold 8 from the leading end face 22 to the trailing end face 24. The central axle passage 12 of the manifold 8 has a diameter that is sized to accommodate and receive common types of wheel axles. Preferably, the diameter of the central axle passage 12 in the manifold 8 is between 0.600 inches and 2.78 inches, typically about 1.20 inch. It is to be appreciated that the opening of the central axle passage 12 at the leading end 16 of the manifold 8 may have an inner beveled or chamfered surface 26 which facilitates centering and insertion of the wheel axle 6 in the central axle passage 12 as the grease tool 2 is arranged in an aligned position for applying grease to the wheel bearing 4.

The manifold 8 has an exterior surface 28 that includes a leading cylindrical portion 30 and a trailing flared portion 32. It is to be appreciated that the overall size, e.g., diameter and axial length, of the cylindrical portion 30 of the manifold 8 will depend upon the size of the inner race 34 of the wheel bearing 4 to be greased by the grease tool 2 (see FIG. 4). Normally the cylindrical portion 30 of the manifold 8 has a diameter which is slightly smaller than the inner diameter of the two inner races 34 of the wheel bearing 4 to be greased such that the manifold 8 can be introduced into the inner race 34. The cylindrical portion 30 of the manifold 8 has a diameter between 0.75 inch and 3.7 inches, typically about 2.00 inches, and has an axial length of between 0.75 inch and 4.5 inches, typically about 2.00 inches. It is to be appreciated, however, that the overall size and axial length of the cylindrical portion 30 of the manifold 8 can vary, depending upon the particular application, without departing from the spirit and scope of the invention. The leading end 16 of the cylindrical portion 30 of the manifold 8 can be provided with an outer beveled or chamfered surface 35 (see FIGS. 6A, 6C and 6E), which facilitates centering and insertion of the leading end 16 of the grease tool 2 into the two inner races 34 of the wheel bearing 4 to be greased.

Axially trailing the cylindrical portion 30, the exterior surface 28 of the manifold 8 has a flared portion 32, i.e., the exterior surface 28 flares radially outward from the cylindrical portion 30 toward the trailing end face 24 of the manifold 8, such that the trailing end face 24 of the manifold 8 can accommodate axially aligned connection holes or apertures 36 which are described below in further detail. The interface between the cylindrical portion 30 and the flared portion 32 of the manifold 8 forms a shoulder 38 in the exterior surface 28 thereof. The shoulder 38 functions as an axial stop for precisely locating the grease tool 2 in an aligned position (see FIGS. 11, 12) relative to the wheel bearing 4 to be greased, as discussed below, and thereby preventing over insertion of the cylindrical portion 30 of the manifold 8 into the wheel bearing 4. As shown in FIG. 12, the diameter of the shoulder 38 is at least somewhat larger than the inner diameter of the inner race 34 of the wheel bearing 4 to prevent further insertion of the grease tool 2 into the wheel bearing 4 beyond the aligned position. Normally the diameter of the exterior surface 28 increases to between 0.020 inches and 0.75 inches, typically about 0.30 inches at the shoulder 38. At the trailing end face 24 of the manifold 8 (see FIGS. 6B-6D), the diameter of the exterior surface 28 increases to between 1.25 inches and 3.5 inches, typically about 2.0 inches. It is to be appreciated, however, that the overall size, length and diameter of the flared portion 32 can vary, from application to application, without departing from the spirit and scope of the invention.

As shown in FIGS. 7A-7E, the handle 10 is a substantially cylindrical member which has a leading end 40 and a trailing end 42. The leading end 40 of the handle 10 releasably mates with the trailing end 20 of the manifold 8 while the trailing end 18 of the grease tool 2 also forms the trailing end 42 of the handle 10. Each of the leading and trailing ends 40, 42 of the handle 10 comprise a respective end surface 44, 46. The central axle passage 12 extends completely through the handle 10 from the leading end surface 44 to the trailing end surface 46 of the handle 10. When the manifold 8 and the handle 10 are coupled together, the central axle passage 12 of the handle 10 is coaxially aligned with the central axle passage 12 of the manifold 8. The diameter of the central axle passage 12 of the handle 10 is substantially the same size as the diameter of the central axle passage 12 of the manifold 8 such that the central axle passage 12 in the handle 10 receives the wheel axle 6 when the wheel axle 6 passes into the manifold 8.

The handle 10 has an exterior surface 48 that is substantially cylindrical, although the exterior surface 48 of the handle 10 typically has a slight depression 50 that is generally centrally located along the axial length thereof between the leading and trailing end surfaces 44, 46 of the handle 10. The depression 50 in the handle 10 facilitates gripping of the grease tool 2, by a technician, both during introduction of the grease tool 2 with the inner races 34 of the wheel bearing 4 as well as removal of the grease tool 2 therefrom. The axial length of the handle 10 is sized such that the exterior surface 48 of the handle 10 provides an adequate surface area to facilitate easy gripping of the grease tool 2 by the technician during use of the grease tool 2. Normally, the handle 10 has an axial length of between 0.37 inches and 4.0 inches, typically about 2.0 inches. The diameter of the exterior surface 48 of the handle 10 is slightly larger than the diameter of the flared portion 32 of the manifold 8 at the trailing end 20 thereof, such that the trailing end face 24 of the manifold 8 can be received within the leading end face 44 of the handle 10 in the manner described below in more detail. The handle 10 has a diameter between 1.00 inch and 4.00 inches, and typically about 2.00 inches. It is to be appreciated, however, that the overall size and axial length of the handle 10 can vary, from application to application, without departing from the spirit and scope of the invention. It is to be further appreciated that the exterior surface 48 of the handle 10 can be machined or tooled to enhance gripping of the handle 10. For example the machining or tooling 51 (see FIG. 7C) of the exterior surface 48 of the handle 10 can include knurling, a series of fine ridges, serrations, beads, knobs, grooves and/or protuberances formed therein to assist with gripping the grease tool 2.

Figures 7A, 7B:
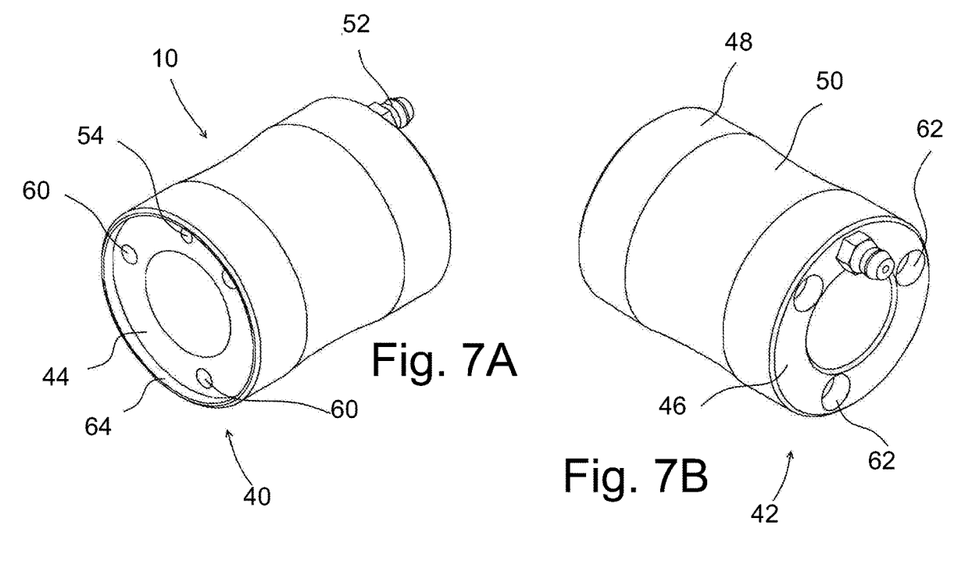
FIG. 7A is a leading perspective view of the handle of the grease tool of FIG. 1.
FIG. 7B is a trailing perspective view of the handle of the grease tool of FIG. 7A.
Figure 7C:
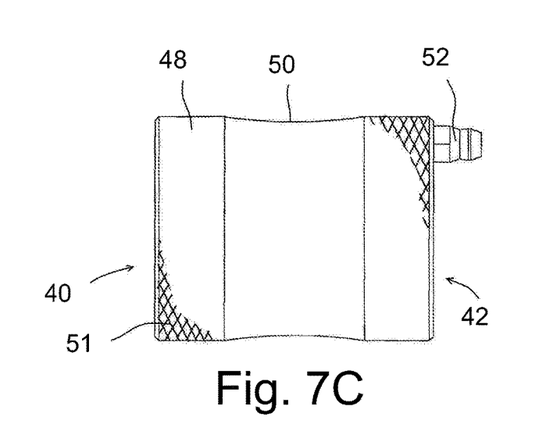
FIG. 7C is a side elevational view of the handle of the grease tool of FIG. 7A.

The trailing end face 46 of the handle 10 is generally a flat annular surface. It is to be appreciated that desired marking indicia, such as the part number, the size of the grease tool 2, etc., can be (laser) marked on the trailing end face 46 of the handle 10, or the exterior surface 28, 48 of the handle 10 and/or manifold 8, or on any other surface of the grease tool 2, to readily identify the grease tool 2 and facilitate using the correct grease tool 2 with the correct wheel bearing 4.

Figure 1:
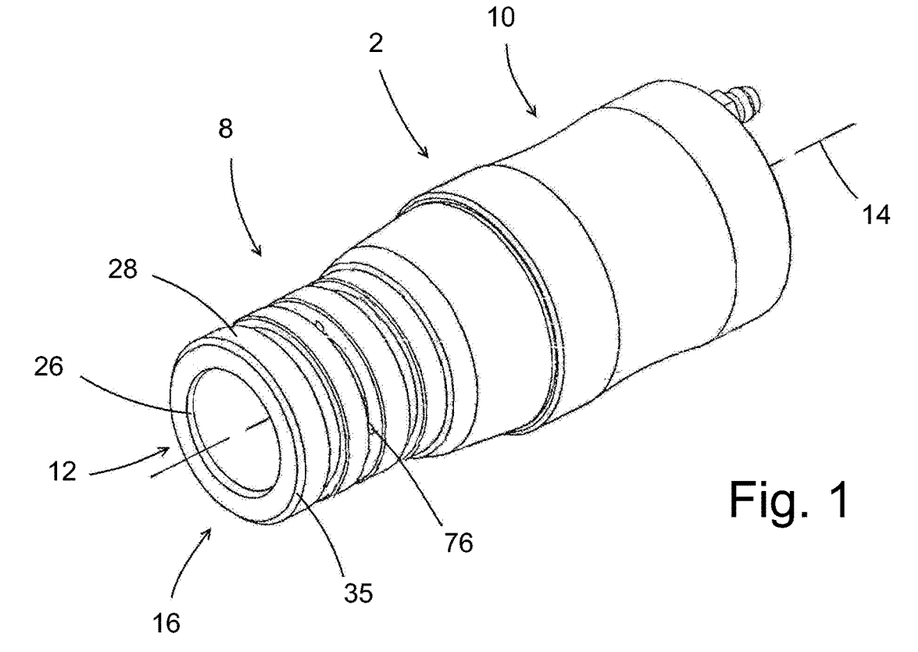
FIG. 1 is a leading perspective view of an embodiment of the grease tool according to the invention.
Figure 2:
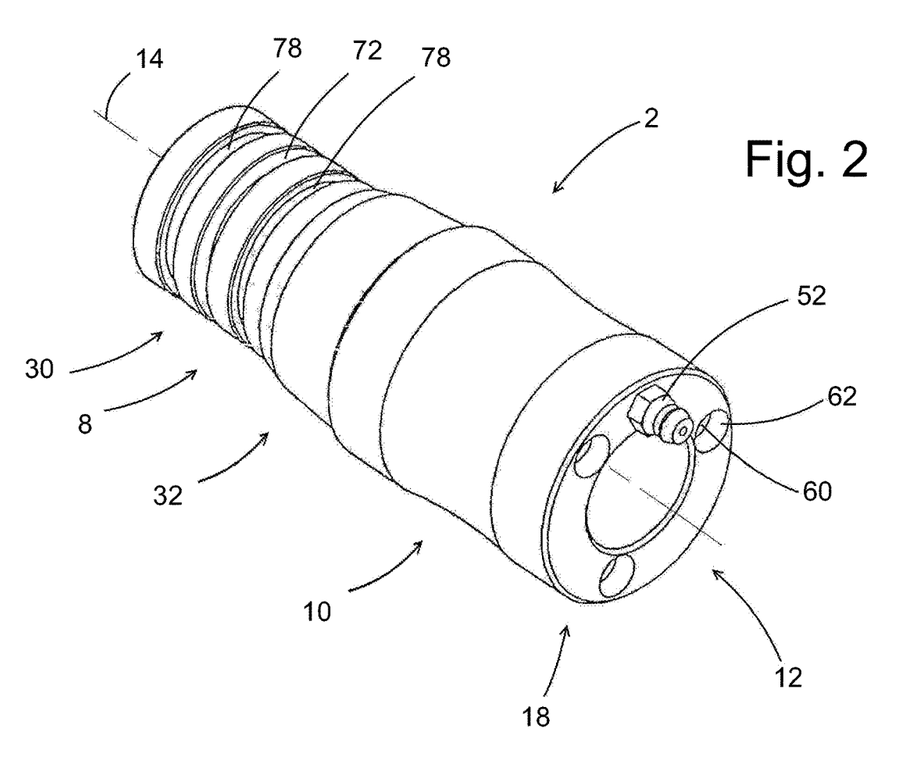
FIG. 2 is a trailing perspective view of the grease tool of FIG. 1.
Figure 3:
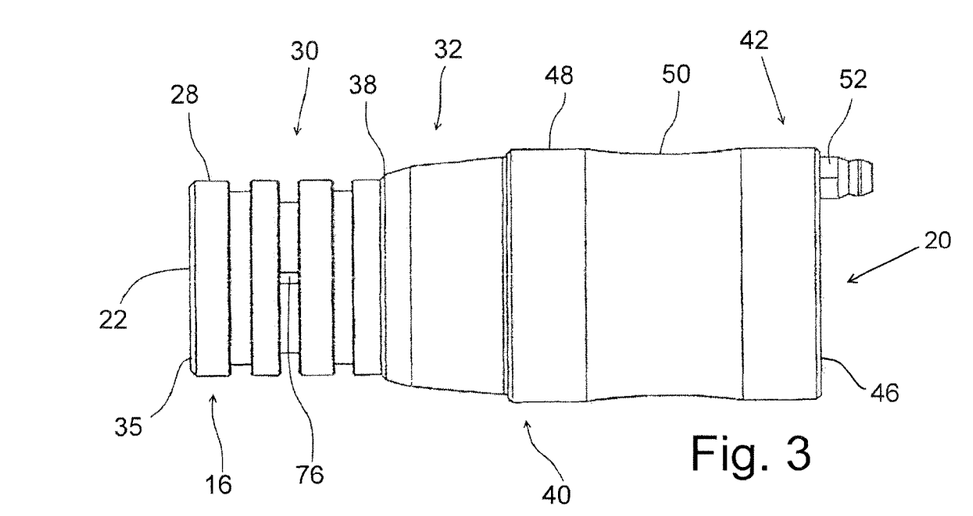
FIG. 3 is a side elevational view of the grease tool of FIG. 1.
Figure 4:
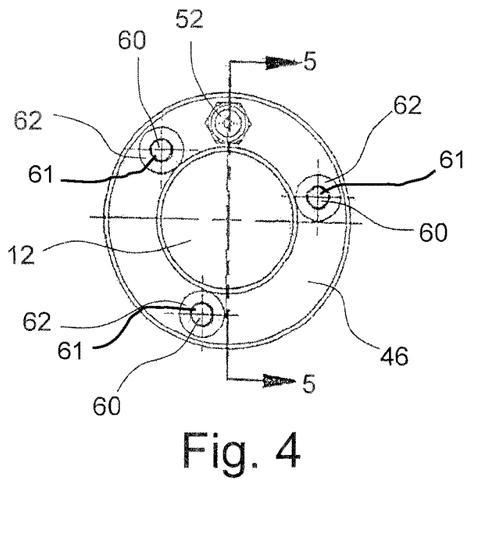
FIG. 4 is a rear elevation view the grease tool of FIG. 1.
Figure 5:
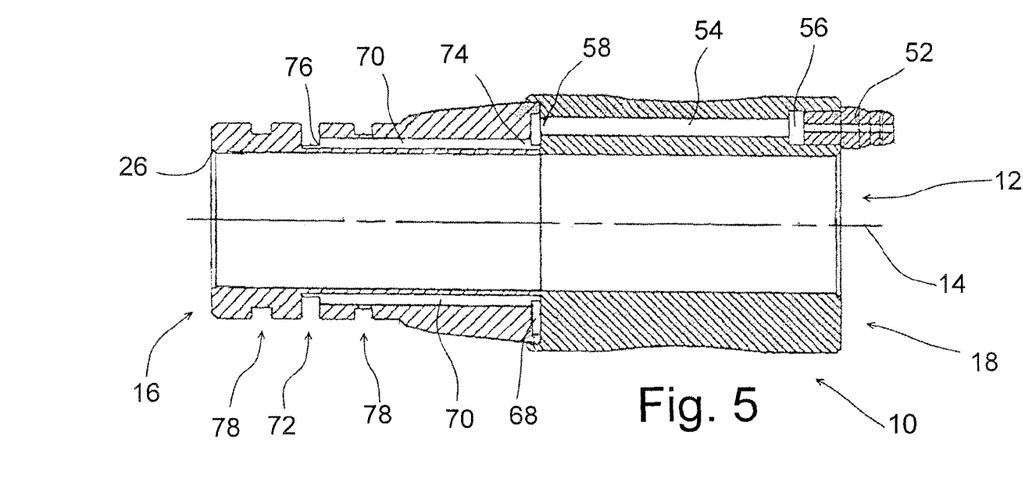
FIG. 5 is a cross sectional view of the grease tool along section line 5-5 in FIG. 4.

The trailing end face 46 of the handle 10 supports a grease nipple or fitting 52, e.g., a zerk fitting, which facilitates coupling or connection of a conventional grease dispenser (not shown), e.g., a grease gun, to the grease tool 2 of the present invention in a conventional manner. As shown in FIG. 5, the handle has a supply duct 54 that extends axially between the leading and trailing end faces of the handle 10. The supply duct 54 has an inlet end 56 formed in the trailing end face 46 of the handle 10 and an outlet end 58 formed at the leading end face 44 of the handle 10. At least a short distance of the inlet end 56 of the supply duct 54 is threaded. A mating threaded end of the grease nipple or fitting 52 is threaded into the threaded inlet end 56 of the supply duct 54 to connect the grease nipple or fitting 52 to the grease tool 2 and facilitate fluid communication between the conventional grease dispenser and the supply duct 54. Such threaded connection, between the grease nipple or fitting 52 and the threaded inlet end 56 of the supply duct 54, facilitates removal of the grease nipple or fitting 52 from the grease tool 2 for periodic cleaning or in the event that the grease nipple or fitting 52 becomes damaged, malfunctions or otherwise requires replacement. To simplify the supply of grease to the wheel bearing 4, the handle 10 only has a single supply duct 54 which directs the supply of grease from the conventional grease dispenser through the handle 10.

Figure 7D:
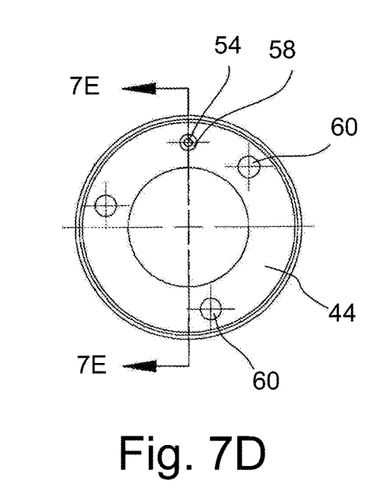
FIG. 7D is a leading elevation view of the handle of the grease tool of FIG. 7A.

The handle 10 has a number of axially aligned connection holes or apertures 60. These connection holes or apertures 60 in the handle 10 are best shown in FIGS. 7A, 7B and 7D, for example. In order to couple the manifold 8 to the handle 10, the connection holes or apertures 60 in the handle 10 are aligned with corresponding threaded connection holes or apertures 36 in the manifold 8. Threaded or partially threaded connectors 61, e.g., conventional bolts or screws, are passed through the connection holes or apertures 60 of the handle 10 and threadedly engage with the corresponding threaded connection holes or apertures 36 of the manifold 8. As the threaded or partially threaded connectors threadedly engage further, the manifold 8 and the handle 10 are coupled with one another to form the grease tool 2. As such connectors and the manner of utilizing the same to connect components are well known, further discussion of the same is not believed to be necessary.

The connection holes or apertures 60 have counterbores 62, at the trailing end face 46 of the handle 10, to facilitate fully receiving the heads of the respective threaded connectors. Although the figures illustrate three sets of connection holes or apertures 36, 60 evenly distributed about the circumference of the manifold 8 and the handle 10, it is to be appreciated that the manifold 8 and the handle 10 can be connected to one another by more or less connectors without departing from the spirit and scope of the present invention. In another variation of the grease tool 2, it is possible for the trailing end 20 of the manifold 8 to have either an inner or an outer threaded surface while the leading end 40 of the handle 10 has the other of an outer or an inner threaded surface which mate with each other to form a threaded connection between the manifold 8 and the handle 10. For example, an exterior annular surface 21 at the trailing end 20 of the manifold 8 (see FIG. 6C) as well as an interior surface of annular outer rim 64 of the leading end face 44 of the handle 10 (see FIG. 7A) can each be threaded thereby enabling the handle 10 and the manifold 8 to be threadedly coupled.

Figure 7E:
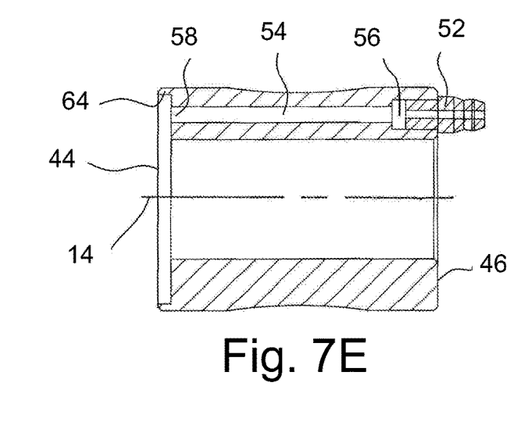
FIG. 7E is a cross sectional view of the handle of the grease tool along section line 7E-7E in FIG. 7D.

As briefly noted above, the trailing end face 24 of the manifold 8 is partially received by the leading end face 44 of the handle 10 when the manifold 8 and handle 10 are coupled to one another. The leading end face 44 of the handle 10 has an annular outer rim 64 which is sized and shaped to receive the trailing end face 24 of the manifold 8. Although FIGS. 5 and 10-12 show the trailing end face 24 of the manifold 8 being received within the annular outer rim 64 of the leading end face 44 of the handle 10, it is to be appreciated that the trailing end face 24 of the manifold 8 can be formed to have an outer rim which is sized and shaped to receive the leading end face 44 of the handle 10. As shown in FIGS. 7A and 7E, the outer rim 64 extends axially from the leading end face 44 of the handle 10 and has an inner diameter that is substantially the same size as the diameter flared portion 32 of the manifold 8 at the trailing end face 24 thereof.

The trailing end face 24 of the manifold 8 has an annular recess 66 which forms an annular chamber 68 (see FIGS. 5, 6B, 6E and 8) with the leading end face of the handle 10 when the trailing end face 24 of the manifold 8 engages the leading end face 44 of the handle 10 after coupling the manifold 8 to the handle 10. The annular chamber 68 functions to direct the supply of grease equally and evenly, prior to supplying the supply passages 70, from the supply duct 54 radially around the circumference of the annular chamber 68 formed between the manifold 8 and the handle 10. The manifold 8 typically has between two and twenty supply passages 70 which communicate with the annular chamber 68. The supply passages 70 in the manifold 8 extend axially from the annular chamber 68, in the trailing end face 24 thereof, to an annular delivery recess 72 located centrally along the cylindrical portion 30 of the manifold 8 in the exterior surface 28 thereof. As shown in FIGS. 5 and 6E, the supply passages 70 are located within the manifold 8 radially adjacent the central axle passage 12 and have inlet ends 74 that open to the annular recess 66 in the trailing end face 24 of the manifold 8 and outlet ends 76 that open to the delivery recess 72. The supply passages 70 generally have a diameter of between 0.03 inches and 0.30 inches, typically about 0.120 inches, and the delivery recess 72 generally has an axial width of between 0.01 inches and 0.75 inches, typically about 0.12 inches. If desired, the sizes of the supply passages 70 and the delivery recess 72 can be increased or decreased, depending upon the particular application and desired distribution of grease.

The annular delivery recess 72 functions to distribute the supplied grease radially outward toward the exterior surface 28 of the cylindrical portion 30 of the manifold 8. When the supplied grease reaches the exterior surface 28 of the cylindrical portion 30 of the manifold 8, the supplied grease is typically uniformly circumferentially distributed around the periphery of the exterior surface 28 of the cylindrical portion 30 of the manifold 8 prior to flowing radially into the wheel bearing 4, as will be discussed below in further detail. The supply duct 54, the annular chamber 68, the supply passages 70 and the delivery recess 72 together form a fluid conduit through which grease can be supplied from the conventional grease dispenser to the inner races 34 of the wheel bearing 4.

Figure 6A:
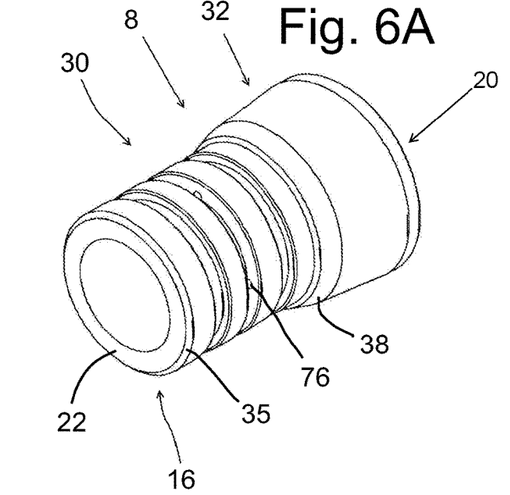
FIG. 6A is a leading perspective view of the manifold of the grease tool of FIG. 1.
Figure 6B:
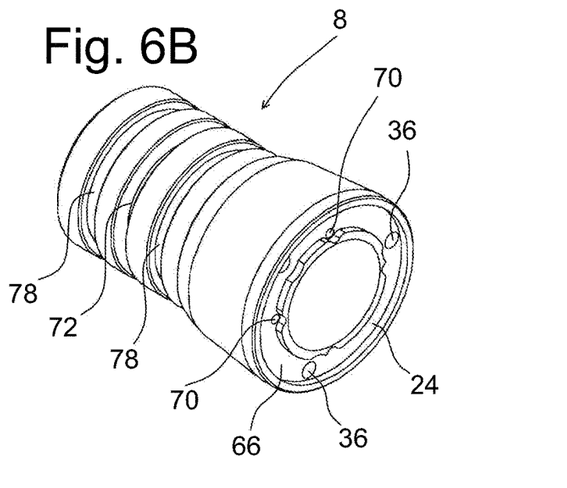
FIG. 6B is a trailing perspective view of the manifold of the grease tool of FIG. 6A.
Figure 6C:
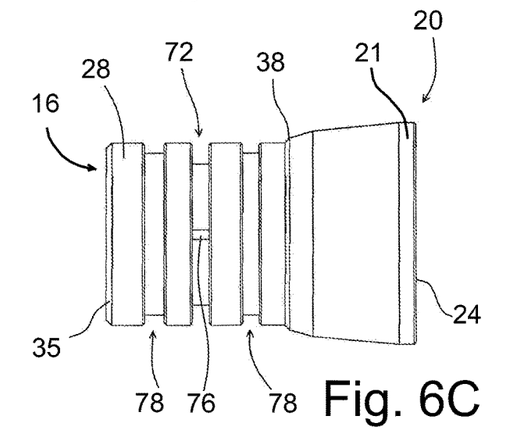
FIG. 6C is a side elevational view of the manifold of the grease tool of FIG. 6A.
Figure 6D:
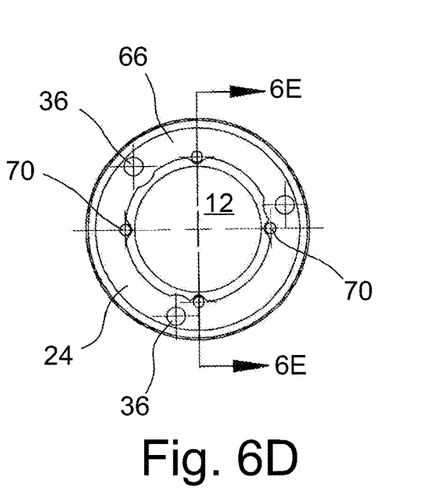
FIG. 6D is a rear elevation view of the manifold of the grease tool of FIG. 6A.
Figure 6E:
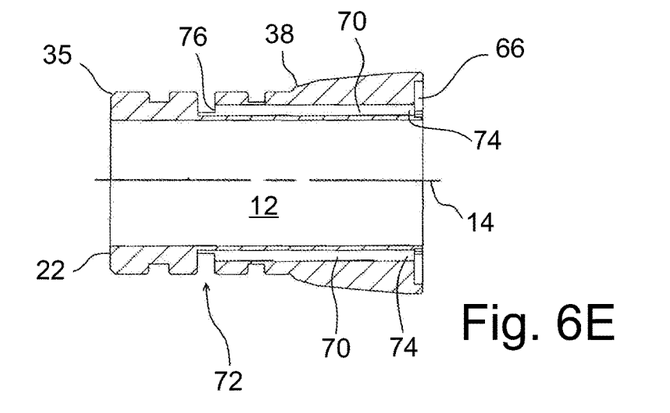
FIG. 6E is a cross sectional view of the manifold of the grease tool along section line 6E-6E in FIG. 6D.

As clearly shown in FIGS. 6C and 6E, a pair of spaced apart annular channels 78 are formed in the exterior surface 28 of the cylindrical portion 30 of the manifold 8. Each one of these annular channels 78 is typically axially spaced from the delivery recess 72 by a distance of between 0.10 inches and 2.00 inches, typically about 0.70 inches. It is to be appreciated that the axial distance between the these annular channels 78 enables the grease tool 2 to be used to service a variety of wheel bearings 4 having differently sized axial dimensions or rather widths. As shown in FIG. 12, a conventional O-ring 80 is accommodated within each one of the annular channels 78 and the O-rings 80 assist with retaining the supplied grease therebetween and channeling of the supplied grease radially into an annular gap 82 formed in the inner race 34 of the wheel bearing 4. The annular channels 78 each have a width of between 0.020 inches and 0.25 inches, typically about 0.14 inches, and a depth of between 0.03 and 0.130 inches. Each one of the O-rings 80 is preferably manufactured from a rubber material, such as Buna-N, and has an outer diameter of between 0.50 inches and 3.00 inches, typically about 1.5 inches.

As briefly described above, the outer diameter of the cylindrical portion 30 of the manifold 8 is, as generally shown in FIGS. 9-12, slightly smaller, e.g., between about 0.005 to about 0.18 inches, than the inner diameter of the pair of inner races 34 of the wheel bearing 4 to be filled with grease so that the cylindrical portion 30 of the manifold 8 can be readily and easily inserted into the inner races 34 while an outer circumference of the O-rings 80 still form a sufficient grease seal with the inner races 34 and fitting over the axle 6. The overall dimensions of the pair of annual channels 78 and the diameter of the pair of O-rings 80 are selected such that the outwardly facing exterior surface of the pair of O-rings 80 will each be compressed and have a slight interference fit, e.g., about 0.002 to about 0.03 inches, with the inwardly facing surface 84 of the pair of inner races 34 of the wheel bearing 4 to be filled with grease. As a result of this arrangement, each one of the O-rings 80 forms a fluid tight seal with a respective one of the inwardly facing surfaces 84 of the inner races 34 of the wheel bearing 4 so as to prevent, or minimize at the very least, any grease from flowing past either one of those O-ring 80 seals and thereby assist with redirecting and channeling the supplied grease radially through the annular gap 82, formed between the inner races 34, and into the wheel bearing chamber 86 of the wheel bearing 4 to be greased for displacing of any air pockets, voids, liquid, water, dirt, debris, etc., contained therein, as will be described in further detail hereinafter. It is to be appreciated that the number of the O-rings 80 used with the grease tool 2 can vary generally depending on the size of the O-rings 80 or rather on the seal that they form with the surfaces 84 of the inner races 34. For example, if the O-rings 80 have a larger size so as to form a tight seal with the inner races 34 then a minimum of only two O-rings 80 can be sufficient for containing the grease therebetween. In a similar manner, the manifold can include two or more pairs of O-rings in order to form a tighter seal with the inwardly facing surfaces of the inner races of the wheel bearing. In this case, two or more annular channels can be located in the exterior surface on each side of the annular delivery recess so as to accommodate the two or more pairs O-rings and better seal the space between the manifold portion and the inwardly facing surfaces of the inner races of the wheel bearing.

Figure 8:
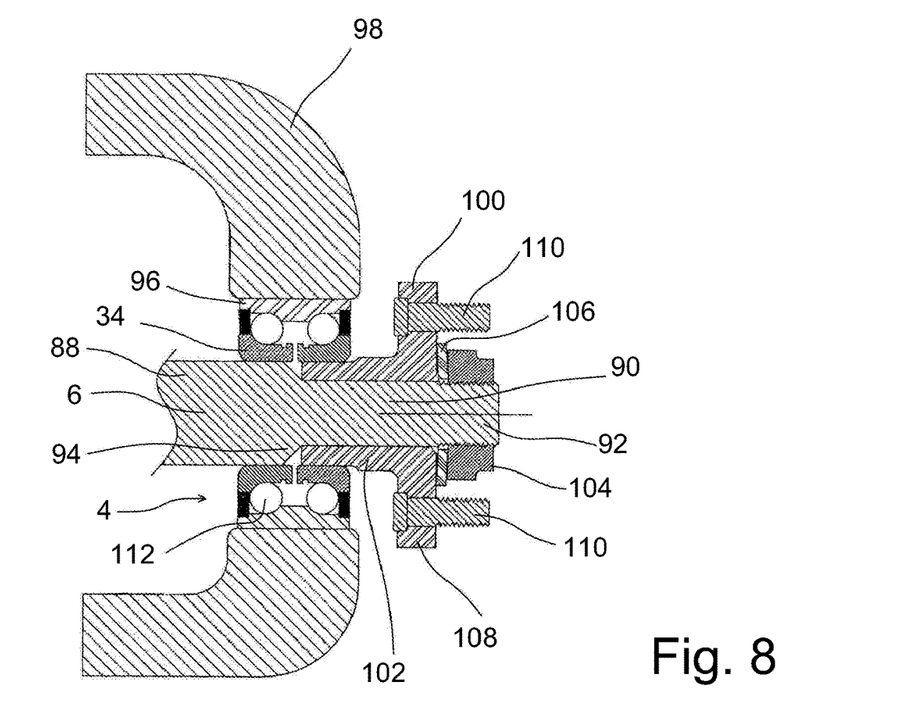
FIG. 8 is a diagrammatic cross sectional view of an axle/hub/bearing assembly in an installed condition.

Now with reference to FIGS. 8-11, use of the grease tool 2 to grease a desired wheel bearing 4 will now be described. FIG. 8 shows a conventional assembly including a wheel axle 6 which is supported by an inner race 34 of a wheel bearing 4. The wheel axle 6 comprises a thick axial section 88 having a relatively larger diameter and a narrow remote section 90 having a relatively smaller diameter and an axial end 92 that is threaded. The wheel axle 6 also has a shoulder 94 where the diameter of the wheel axle 6 transitions from the thicker section 88 to the narrow remote section 90. The outer race 96 of the wheel bearing 4 can be supported by a part 98 such as a body member, a suspension element or a steering component, e.g., a steering knuckle or bearing hub. In the assembled condition shown in FIG. 8, a wheel hub 100 is supported on the remote section 90 of the wheel axle 6. The wheel hub 100 comprises a substantially cylindrical section 102 that is supported on or "over" the wheel axle 6 and within the inner race 34 of the wheel bearing 4 and is secured in this assembled position by means of a nut 104 that is screwed onto the threaded end 92 of the wheel axle 6 until the wheel hub 100 is received within the inner race 34 of the wheel bearing 4 and axially abuts against the shoulder 94. A washer 106 is typically located between the nut 104 and the flange portion 108 of the wheel hub 100. The wheel hub 100 comprises a plurality of threaded wheel studs 110, only two of which are shown in FIGS. 8-11, to which a wheel (not shown) can be secured by conventional lug nuts (not shown).

Figure 9:
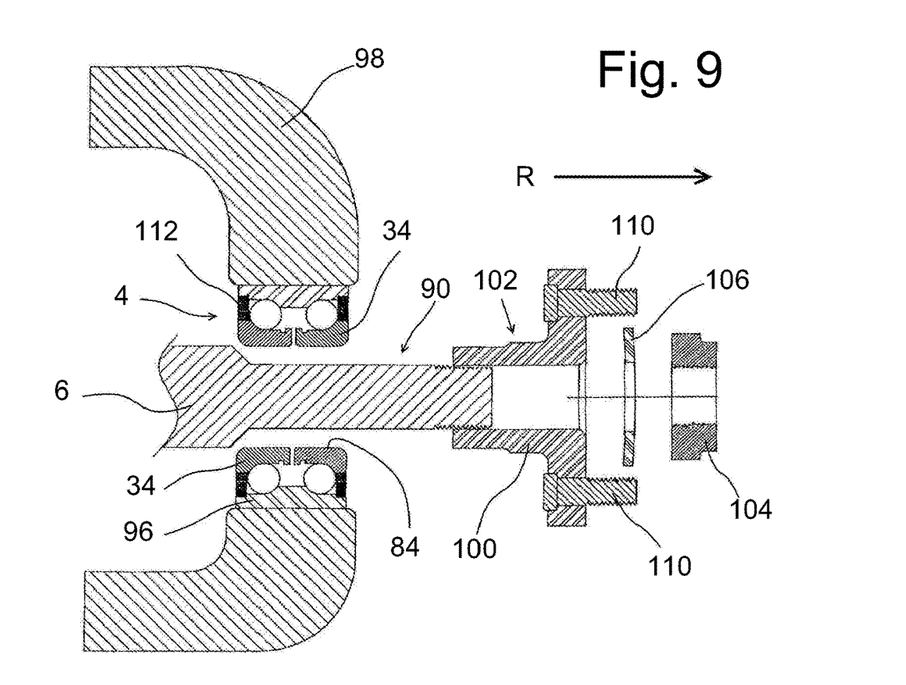
FIG. 9 is a diagrammatic cross sectional view of the axle/hub/bearing assembly showing removal of the hub in preparation for greasing of the bearing while positioned on the wheel axle.

In order to gain access to the wheel bearing 4 to be greased, such as a dual angular contact wheel bearing 4 for an all-terrain vehicle (ATV), the section of the vehicle containing the wheel bearing 4 to be greased is typically raised off the ground, or some other supporting surface, by a conventional jack or lift to facilitate servicing of the vehicle. Thereafter, the lug nuts (not shown) are loosened from the wheel studs 110 and the wheel (not shown) is removed and, if necessary, the brake rotor and caliper (not shown) is also removed in order to provide access to a wheel hub 100. As is conventional in the art, the wheel hub 100 rotates within the inner races 34 of the wheel bearing 4 to be greased. In order to provide access to the inner races 34, the wheel hub 100 is then withdrawn in the removal direction R by first loosening and removing the nut 104 and washer 106, in a conventional manner, and then drawing or pulling the wheel hub 100 out of the wheel bearing 4 and off the wheel axle 6, as shown in FIG. 9, thereby exposing and providing direct access to at least the inner races 34 of the wheel bearing 4 to be greased. Once access to the inner races 34 is established, the operator can then clear away any "old" grease, loose dirt, debris, etc., located on or around the inner races 34 and thereby facilitate unhindered insertion of the grease tool 2.

Figure 10:
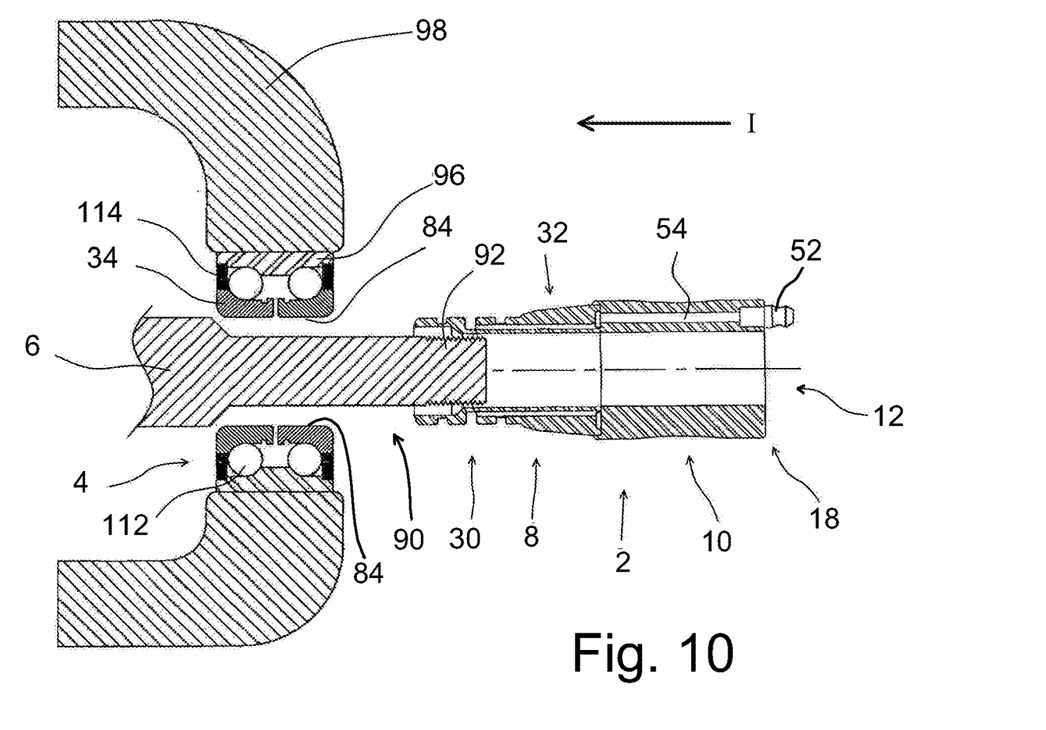
FIG. 10 is a diagrammatic cross sectional view of the axle/hub/bearing assembly showing initial insertion of the grease tool on the wheel axle for greasing of the bearing.
Figure 11:
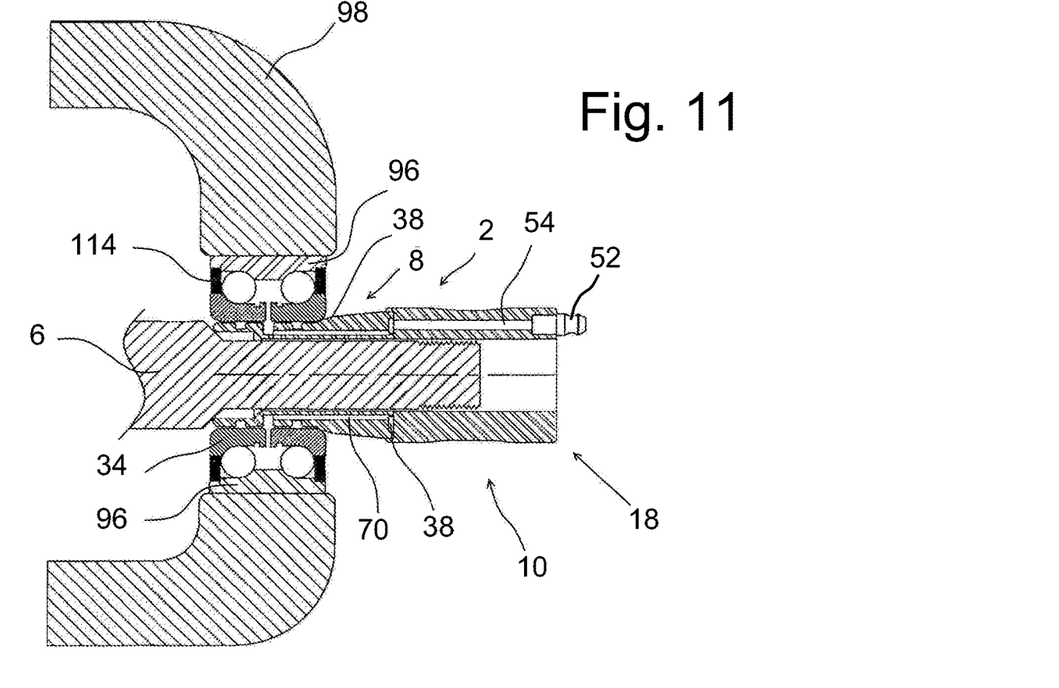
FIG. 11 is a cross sectional view of the axle/hub/bearing assembly showing the grease tool fully inserted into the bearing for greasing of the bearing while supported by the wheel axle.
Figure 12:
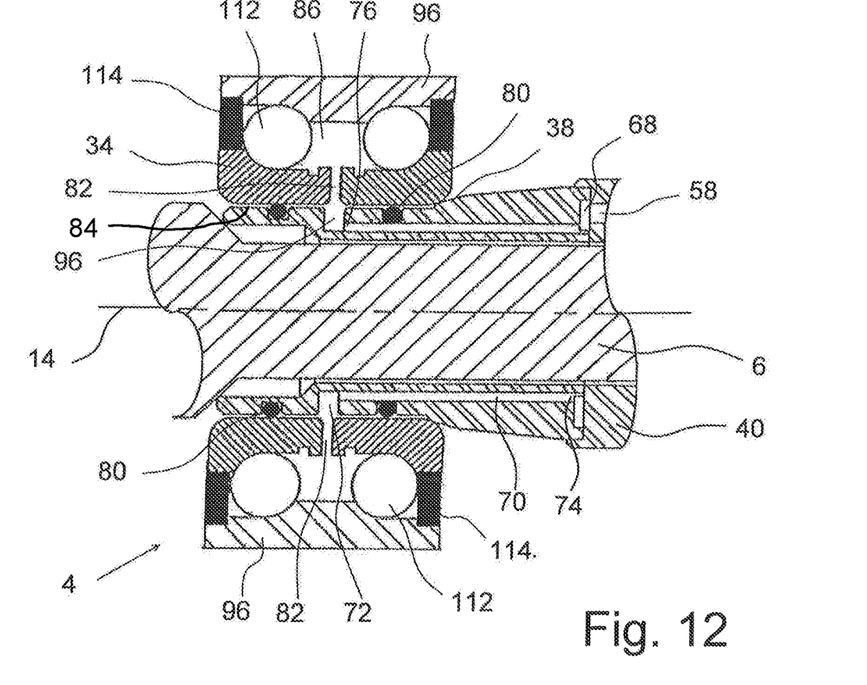
FIG. 12 is an enlarged diagrammatic partially cross sectional view of the grease tool fully inserted into the bearing for greasing of the bearing while positioned on the wheel axle.

After initially clearly away any old grease, loose dirt, debris, etc., from the inner races 34, the operator, as shown in FIG. 10, then inserts the leading end 16 of the grease tool 2 in the insertion direction I over the wheel axle 6 and into the inner races 34 of the wheel bearing 4 until the shoulder 38 of the exterior surface 28 of the manifold 8 eventually abuts against the inner race 34 of the wheel bearing 4, as generally shown in FIGS. 11 and 12. At the same time the leading end 16 of the grease tool 2 may abut the shoulder 94 of the wheel axle 6 and axially displace the wheel axle 6 relative to the wheel bearing 4.

Once the grease tool 2 is introduced into the inner races 34, the pair of O-rings 80 are both properly located on either side of the gap 82, formed between the pair of inner races 34 of the wheel bearing 4. The pair of O-rings 80 are correctly positioned to form a pair of spaced apart annular seals which assist with redirecting the supplied grease radially toward and through the gap 82 formed between the inner races 34 of the wheel bearing 4. It is to be appreciated that in the aligned position of the grease tool 2, the gap 82 must be located within the "working range" of the grease tool 2, i.e., anywhere between the pair of annular channels 78 and O-rings 80, in order to facilitate the supply of grease thereto during servicing of the wheel bearing 4.

Once the grease tool 2 is properly installed over the wheel axle 6 and within the pair of inner races 34 of the wheel bearing 4, as generally shown in FIGS. 11 and 12, a conventional grease dispenser (not shown) is then connected to the grease nipple or fitting 52, in a conventional manner, in order to supply grease thereto. As the grease is supplied by the conventional grease dispenser, the grease flows through the grease nipple or fitting 52, axially along the supply duct 54 and then radially around the annular chamber 68, along each of the at least one or more axially extending supply passages 70, radially outward through the outlet ends 76 thereof and into the annular delivery recess 72 of the grease tool 2 for distribution to the wheel bearing 4. It is to be appreciated that, because the plurality of supply passages 70 are circumferentially distributed about the manifold 8, grease is supplied to the annular chamber 68 and subsequently to the wheel bearing 4 in an even and uniform manner thereby enhancing the efficiency of repacking the wheel bearings 4. Due to the even and uniform distribution of grease by way of the plurality of supply passages 70, repacking of the wheel bearings 4 is simplified since rotation of the grease tool 2 in order to direct the supply of grease to each of the radial segments of the wheel bearing 4 is not necessary.

Once the supplied grease reaches the exterior surface 28 of the cylindrical portion 30 of the manifold 8, the supplied grease typically first completely fills the space located between the exterior surface 28 of the cylindrical portion 30 of the manifold 8, the opposed pair of O-rings 80 and the inwardly facing surface 84 of the pair of inner races 34 of the wheel bearing 4. Generally once this space is completely filled with and slightly pressurized by the supplied grease, then the supplied grease commences flowing radially again through the conventional annular gap 82 formed between the pair of inner races 34 of the wheel bearing 4. The O-rings 80 assist with channeling and redirecting the supplied grease radially through the gap 82, provided between the pair of inner races 34 of the wheel bearing 4, into a wheel bearing chamber 86 of the wheel bearing 4. As generally shown, a plurality of ball bearings 112 are accommodated within the wheel bearing chamber 86 between the inner and the outer races 34, 96 of the wheel bearing 4.

The supplied grease applies pressure to the gap 82 which tends to cause the inner races 34 to be biased away from one another and thereby increase the axial length of the gap 82 formed between the inner races 34. It is to also be appreciated that the inner races 34 can be pushed away from the seals formed by the O-rings 80 when filling the wheel bearing 4 with grease. In this manner, "old grease" can be forced out of the wheel bearing 4 as "new grease" is forced into the wheel bearing 4. As the supplied grease flows into the wheel bearing chamber 86 of the wheel bearing 4, the supplied grease tends to displace any "old grease," accommodated therein, as well as any air pocket(s), water, fluid, dirt, debris, etc., contained within the wheel bearing chamber 86 and forces the same axially past the wheel bearings 4 and out through openings in or near either one of the opposed lateral shields 114 formed between the inner races 34 and an outer race 96 of the wheel bearing 4 thereby "repacking" the wheel bearing 4 with fresh grease.

The operator typically continues dispensing grease from the grease dispenser to the wheel bearing 4 until the operator finally detects some of the newly supplied grease leaking or oozing from the openings in or near the opposed lateral shields 114 formed between the pair of inner races and the outer race of the wheel bearing 4. Once a sufficient amount of the newly supplied grease is detected as leaking or oozing from the openings in or near the opposed lateral shields 114, the operator then determines that the wheel bearing 4 is sufficiently filled and repacked with fresh grease and, thereafter, discontinues the supply of additional grease to the wheel bearing 4 being greased. Once filled with newly supplied grease the inner races 34 can seat back up to the lateral shields 114 during reassembly.

Next, the operator disconnects the grease dispenser and typically wipes away and removes any excess grease which leaked or oozed from the openings in the opposed lateral shields 114. Thereafter, the operator then slides the grease tool 2 along the axle 6 away from the pair of inner races 34 of the wheel bearing 4 and then removes the grease tool 2 off the wheel axle 6. Next, the wheel hub 100 is then reassembled within the inner races 34 of the wheel bearing 4, the brake caliper (if disassembled) is reassembled with the wheel axle 6. Finally, the wheel is reinstalled on the wheel hub 100 and the vehicle is lowered onto the ground for use.

Turning now to FIGS. 13-17, another embodiment of the present invention will now be discussed. As this embodiment is similar, in many respects, to the previously discussed embodiment, only the differences between this embodiment and the above described embodiment will be discussed in detail while identical elements will be given identical reference numerals in the drawings.

This embodiment of the grease tool 2' facilitates repacking of wheel bearings 4 when space for servicing of the wheel bearings is limited. In this embodiment, to limit the overall size of the grease tool 2', the handle and the manifold are combined into a single tool body 3. Due to the unitary design, the grease tool 2' can be fabricated from a single piece of material, thereby reducing the costs of manufacturing the grease tool 2'. The tool body 3 has a manifold portion 8' and handle portion 10'. The manifold portion 8' extends along the longitudinal axis 14 from a leading end face 44' of the handle portion 10'. Like the previous embodiment, the outer diameter of the handle portion 10' is greater than the outer diameter of the manifold portion 8' such that when the leading end 16 of the grease tool 2' is inserted over the wheel axle 6 and into the inner races 34 of the wheel bearing 4, the leading end face 44' of the handle portion 10' will abut against an inner race 34 and correctly locate the grease tool 2' in an aligned position relative to the wheel bearing 4. The leading end face 44' of the handle portion 10' can thus function as a stop to facilitate radial alignment of the annular delivery recess 72 with the gap 82 formed between the inner races 34 of the wheel bearing 4.

In this embodiment of the grease tool 2', the tool body 3 has a single supply passage 70 that extends axially from the inlet end 56 formed in the trailing end face 46 of the handle portion 10' to the annular delivery recess 72 located centrally along the manifold portion 8'. As the grease tool 2' has only one supply passage 70, the process of manufacturing the grease tool 2' is simplified and the costs associated therewith are reduced. Furthermore, due to the unitary design of the grease tool 2', as well as the single supply passage 70 it is possible to shorten the overall axial length of the grease tool 2', thereby enabling the grease tool 2' to be used in situations in which the handle access area is limited.

Figures 13, 14:
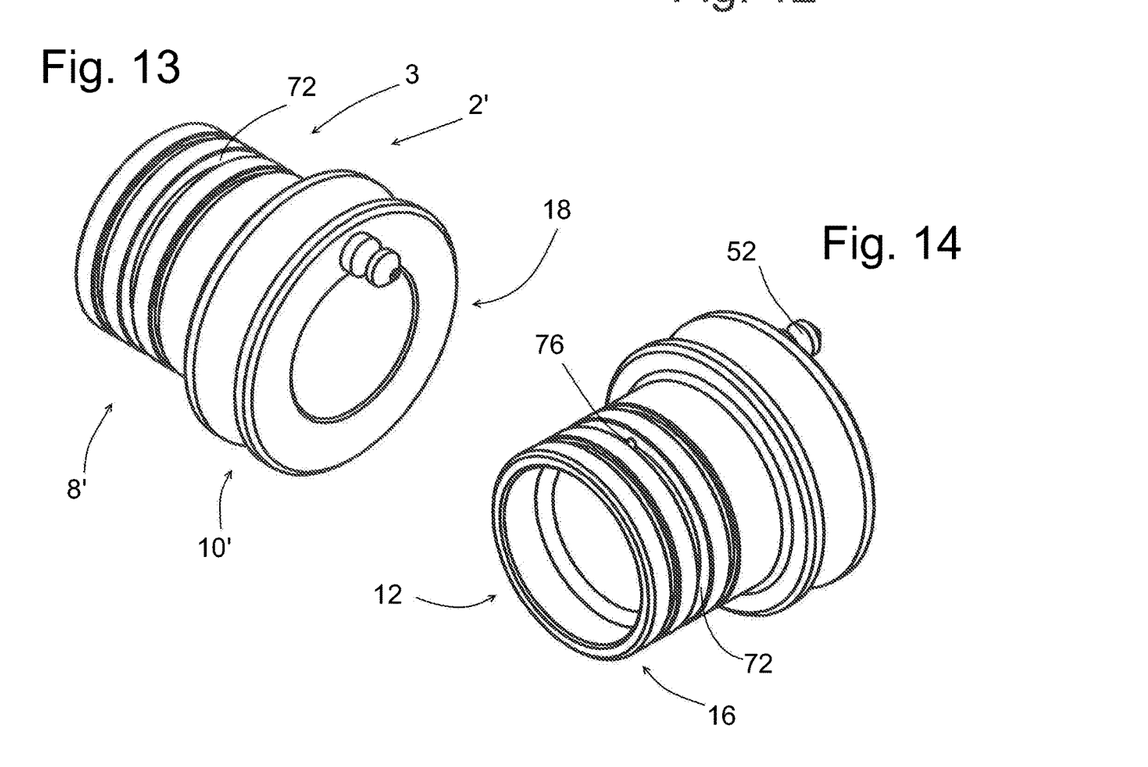
FIG. 13 is a trailing perspective view of another embodiment of the grease tool according to the invention.
FIG. 14 is a leading perspective view of the grease tool of FIG. 13.
Figure 15:
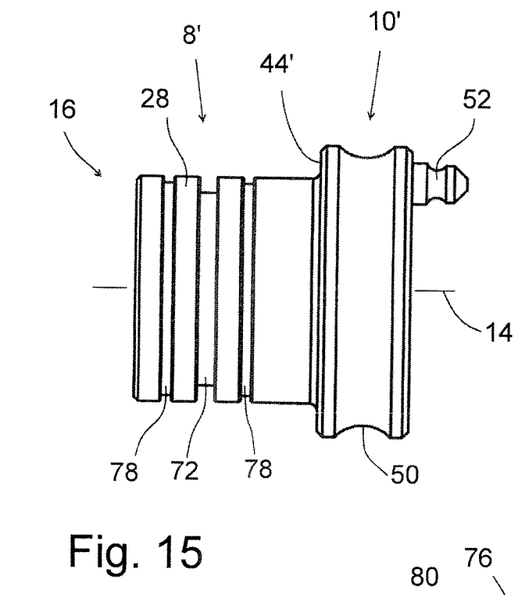
FIG. 15 is a side elevational view of the grease tool of FIG. 13.
Figure 16:
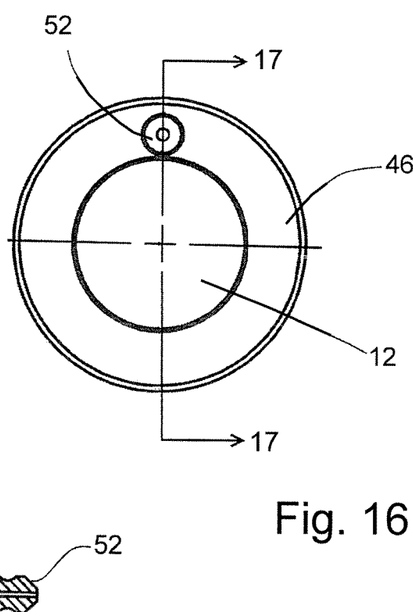
FIG. 16 is a rear elevation view the grease tool of FIG. 13.
Figure 17:
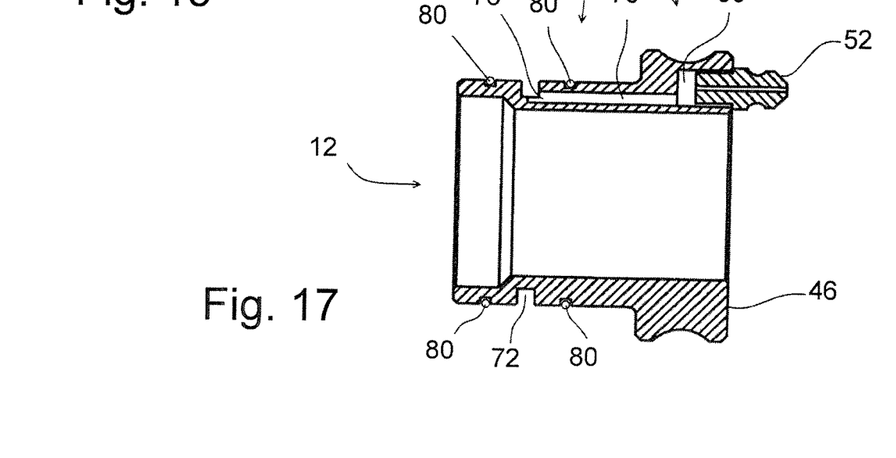
FIG. 17 is a cross sectional view of the grease tool along section line 17-17 in FIG. 16.

Arranged on each side of the annular delivery recess 72, the manifold portion 8' of the grease tool 2' includes an annular channel 78 formed in the exterior surface 28 on each side of the annular delivery recess 72 as shown in FIGS. 13-15. Each of these annular channels 78 accommodates a conventional O-ring 80, as shown in FIG. 17, that assist with retaining the supplied grease therebetween when the grease tool 2' is in use. Although FIGS. 13-15 and 17 only show a single annular channel 78 located on opposite sides of the annular delivery recess 72, it is to be appreciated that two or more annular channels can be located in the exterior surface on each side of the annular delivery recess so as to accommodate two or more O-rings and better seal space between the manifold portion 8' and the inwardly facing surfaces 84 of the inner races 34 of the wheel bearing adjacent the gap 82.

Operation of the grease tool 2' is substantially the same as the embodiment described above. Once the grease tool 2' is properly installed over the wheel axle 6, within the pair of inner races 34 of the wheel bearing 4 and a conventional grease dispenser is connected to the grease nipple or fitting 52, the grease is supplied to and flows through the supply passage 70 to the outlet end 76 thereof. Since the grease tool 2' has only one supply passage 70, when the supplied grease flows into the annular delivery recess 72, it will generally start accumulating in an area of the annular delivery recess 72 close to the outlet end 76. As more grease is supplied, the grease will primarily flow circumferentially around the grease tool 2' within the annular delivery recess 72 and then into the space located between the exterior surface 28 of the manifold portion 8', the opposed O-rings 80 and the inwardly facing surface 84 of the pair of inner races 34 of the wheel bearing 4. When the annular delivery recess 72 and this space become filled with the supplied grease, the space will become slightly pressurized and the supplied grease will then begin flowing radially through the annular gap 82 formed between the pair of inner races 34 of the wheel bearing 4 and into the wheel bearing chamber 86 as described above. To facilitate the circumferential distribution of supplied grease to the wheel bearing 4, it is also possible to pump the conventional grease dispenser to supply grease to one circumferential area of the wheel bearing 4 then rotate the grease tool 2' on the axle 6 about the longitudinal axis 14 to reposition the outlet end 76 of the supply passage 70 with respect to the inwardly facing surface 84 of the pair of inner races 34 of the wheel bearing 4 and supply grease to this circumferential area of the wheel bearing 4 by again pumping the conventional grease dispenser. This process of "pump and rotate" is repeated as necessary to ensure an even and uniform distribution of grease to the wheel bearing 4.

It is to be understood that the invention(s) described herein with reference to the accompanying figures is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure is presented for the purposes of illustration and description. It is not intended to be exhaustive or to limit the present disclosure to the precise form disclosed. Many modifications and variations are possible in light of this disclosure without departing from the spirit and scope of the disclosure. Although operations may be described in a particular order, this should not be understood as requiring that such operations be performed in the disclosed particular order shown or in a sequential order, or that all illustrated operations be performed in order to achieve desirable results.

Wherefore, I claim:

1. A grease tool for sliding over an axle and mating with at least one inner race of a wheel bearing for greasing the wheel bearing while the axle is located within the wheel bearing, the grease tool comprising:
   a handle including a manifold;
   a central passage extending through both the manifold and the handle for receiving the axle;
   the grease tool having a shoulder for abutting against the at least one inner race of the wheel bearing and preventing further insertion of the grease tool into the at least one inner race;
   a grease fitting being attached to a trailing surface of the handle to facilitate supplying grease to the grease tool, and the grease fitting being coupled to at least one supply passage for conveying the grease to an annular delivery recess formed in an exterior cylindrical surface of the manifold;
   at least one pair of O-rings being accommodated by the exterior cylindrical surface of the manifold and the annular delivery recess being formed in the exterior cylindrical surface of the manifold between the pair of O-rings; and
   the pair of spaced apart O-rings, when the grease tool engages with an inwardly facing surface of the at least one inner race of the wheel bearing, forming a pair of spaced apart grease seals which facilitate directing of the grease, supplied to the annular delivery recess, radially into a bearing chamber of the wheel bearing to facilitate repacking the bearing chamber with the grease,
   wherein the handle and the manifold are separate components, and an annular chamber is formed between a trailing end face of the manifold and a leading end face of the handle when the manifold is connected with the handle.

2. The grease tool according to claim 1, wherein the handle has a single supply duct which supplies the grease from the grease fitting through the handle to the annular chamber, and the manifold has between two and sixteen supply passages which communicate with the annular chamber and supply the grease from the annular chamber to the annular delivery recess located between the pair of O-rings to facilitate even and uniform distribution of grease to the bearing chamber of the wheel bearing.

3. The grease tool according to claim 2, wherein an inlet end of the supply duct is threaded, and a mating threaded end of the grease fitting threadedly engages with the threaded inlet end of the supply duct to attach the grease fitting to the grease tool in a removable manner.

4. The grease tool according to claim 1, wherein at least one connector releasably couples the handle to the manifold.

5. The grease tool according to claim 1, wherein a leading end face of the handle has an annular outer rim which is sized and shaped to receive a trailing end face of the manifold and the trailing end face of the manifold has an annular end recess formed therein for matingly engaging with the leading end face of the handle.

6. The grease tool according to claim 1, wherein the grease fitting is releaseably connected to the trailing surface of the handle, and the grease fitting facilitates connection of a grease dispenser to the grease tool for supplying the grease to the grease tool.

7. The grease tool according to claim 1, wherein at least a first and a second annular channel are formed in the exterior cylindrical surface of the manifold on opposite axial sides of the annular delivery recess, and each one of the first and the second annular channels accommodates a respective one of the pair of O-rings.

8. The grease tool according to claim 7, wherein each of the pair of annular channels has a width of between 0.020 and 0.25 inches and a depth of between 0.03 and 0.130 inches, and
   each of the pair of O-rings is manufactured from a rubber material and has an outer diameter of between 0.50 inches and 3.00 inches.

9. The grease tool according to claim 1, wherein an exterior diameter of the manifold is slightly smaller than a diameter of the at least one inner race of the wheel bearing to be greased so that the exterior cylindrical surface of the manifold is insertable into the at least one inner race while each of the pair of O-rings having an interference fit with the inwardly facing surface of the at least one inner race of the wheel bearing to be greased.

10. The grease tool according to claim 1, wherein each one of the pair of O-rings forms a fluid tight seal with the inwardly facing surface of the inner race of the wheel bearing so as to minimize a flow of the grease past either of the pair of grease seals and thereby assist with directing substantially all of the supplied grease radially through an annular gap, formed in the at least one inner race, and into the bearing chamber of the wheel bearing for displacing at least one of air, liquid, water, dirt, and debris contained therein.

11. The grease tool according to claim 1, wherein a leading end of the manifold is provided with an annular chamfered surface which facilitates centering and insertion of a leading end of the grease tool into the inner race of the wheel bearing to be greased.

12. The grease tool according to claim 1, wherein the manifold has a diameter of between 0.75 inches and 3.7 inches and has an axial length of between 0.75 and 4.5 inches.

13. The grease tool according to claim 1, wherein both of the manifold and the handle are manufactured from one of aluminum, plastic, steel or brass.

14. The grease tool according to claim 1, wherein the handle and the manifold are connected with one another and formed as a unitary grease tool, and only one supply passage directly connects the grease fitting with the annular delivery recess.

15. The grease tool according to claim 14, wherein a pair of spaced apart annular channels are formed in the exterior cylindrical surface of the manifold on opposite sides of the annular delivery recess, and each one of the pair of annular channels accommodates one of the pair of O-rings.

16. The grease tool according to claim 15, wherein each of the pair of annular channels has a width of between 0.02 and 0.25 inches and a depth of between 0.03 and 0.130 inches, and
   each of the pair of O-rings is manufactured from a rubber material and has an outer diameter of between 0.80 and 2.75 inches.

17. The grease tool according to claim 14, wherein each one of the pair of O-rings forms a fluid tight seal with the inwardly facing surface of the at least one inner race of the wheel bearing so as to minimize a flow of the grease past either of the fluid tight seals and thereby assist with directing substantially all of the supplied grease radially through an annular gap, formed in the at least one inner race, and into the bearing chamber of the wheel bearing for displacing at least one of air, liquid, water, dirt, and debris contained therein.

18. A grease tool for sliding over an axle and mating with at least one inner race of a wheel bearing for greasing the wheel bearing while the axle is located within the wheel bearing, the grease tool comprising:

a handle including a manifold;

a central passage extending through both the manifold and the handle for receiving the axle;

the grease tool having a shoulder for abutting against the at least one inner race of the wheel bearing and preventing further insertion of the grease tool into the at least one inner race;

a grease fitting being attached to a trailing surface of the handle to facilitate supplying grease to the grease tool, and the grease fitting being coupled to a supply passage for conveying the grease to an annular delivery recess formed in an exterior cylindrical surface of the manifold;

at least one pair of spaced apart annular channels are formed in the exterior cylindrical surface of the manifold on opposite sides of the annular delivery recess, and each one of the pair of annular channels accommodates an O-ring;

the pair of O-rings, when the grease tool engages with an inwardly facing surface of the at least one inner race of the wheel bearing, forming a pair of spaced apart grease seals which facilitate directing of the grease, supplied to the annular delivery recess, radially into a bearing chamber of the wheel bearing to facilitate repacking the bearing chamber with the grease; and each one of the pair of O-rings, during use, forming a fluid tight seal with the inwardly facing surface of the at least inner race of the wheel bearing so as to minimize a flow of the grease past either of the pair of grease seals and thereby assist with directing substantially all of the supplied grease radially through an annular gap, formed in the at least one inner race, and into the bearing chamber of the wheel bearing for displacing at least one of air, liquid, water, dirt, and debris contained therein;

wherein the handle and the manifold are separate components, and an annular chamber is formed between a trailing end face of the manifold and a leading end face of the handle when the manifold is connected with the handle.

19. A grease tool for sliding over an axle and mating with at least one inner race of a wheel bearing for greasing of the wheel bearing while the axle is arranged within the wheel bearing, the grease tool comprising:

a manifold having a leading end, a trailing end and a central passage extending through the manifold from the leading end to the trailing end thereof;

a handle having a leading end, a trailing end and a central passage extending through the handle from the leading end to the trailing end thereof;

the trailing end of the manifold being coupled to the leading end of the handle such that the central passage of the manifold and the central passage of the handle are coaxially aligned and form a central axial channel extending through the grease tool;

the handle having a supply duct radially arranged between the central axial channel and an exterior surface of the handle, the supply duct extending axially through the handle from the leading end of the handle to the trailing end of the handle;

the manifold having at least one supply passage radially arranged between the central axial channel and an exterior surface of the manifold, the at least one supply passage extending axially from the trailing end of the manifold to an annular delivery recess in a radially exterior surface of the handle; and the supply duct of the handle and the at least one supply passage of the manifold forming a flow path along which a supply of grease passes from the trailing end of the handle and through the annular delivery recess to the radially exterior surface of the handle which is located within the at least one inner race of the wheel bearing;

wherein the handle and the manifold are separate components, and an annular chamber is formed between a trailing end face of the manifold and a leading end face of the handle when the manifold is connected with the handle.

* * * * *